United States Patent [19]

Larue et al.

[11] Patent Number: 4,622,825
[45] Date of Patent: Nov. 18, 1986

[54] ABSORPTION METHOD FOR THE GENERATION OF COLD AND/OR HEAT USING A MIXTURE OF SEVERAL CONSTITUENTS AS WORKING FLUID

[75] Inventors: Joseph Larue, Vaucresson; Alexandre Rojey, Garches, both of France

[73] Assignee: Institut Francais du Petrole, Rueil-Malmaison, France

[21] Appl. No.: 727,169

[22] Filed: Apr. 25, 1985

[30] Foreign Application Priority Data

Apr. 25, 1984 [FR] France ............................ 84 06627

[51] Int. Cl.$^4$ ............................................ F25B 15/00
[52] U.S. Cl. ....................................... 62/102; 62/112
[58] Field of Search ....................... 62/101, 102, 112

[56] References Cited

U.S. PATENT DOCUMENTS

| | | | |
|---|---|---|---|
| 1,678,277 | 7/1928 | Von Platen et al. | 62/102 |
| 2,045,204 | 6/1936 | Shagaloff | 62/102 |
| 2,248,178 | 7/1941 | Kuenzli | 62/102 |
| 2,287,855 | 6/1942 | Babcock | 62/102 |
| 2,290,506 | 7/1942 | Thomas | 62/102 |
| 2,440,079 | 4/1948 | D'Halloy | 62/102 X |
| 3,638,452 | 2/1972 | Kruggel | 62/485 |

*Primary Examiner*—Lloyd L. King
*Attorney, Agent, or Firm*—Millen & White

[57] ABSTRACT

Heat and/or cold are produced in an absorption heat converter operated with a solvent and at least two distinct working fluids condensed and vaporized in a temperature range, whereby the yield is increased.

12 Claims, 4 Drawing Figures

ABSORPTION METHOD FOR THE GENERATION OF COLD AND/OR HEAT USING A MIXTURE OF SEVERAL CONSTITUENTS AS WORKING FLUID

This invention relates to an absorption method for the generation of cold or heat that can find applications in many fields, in particular in on-site gas treatment or in domestic or collective heating.

In the methods for the generation of cold and/or heat operating on compression cycles, the working fluid is compressed in the vapor phase and condensed, yielding the heat of condensation to an external cooling fluid (water or air), and is then expanded and vaporized, generating cold. It is possible to avoid using a compressor or driving machinery (engine or turbine) by using an absorption cycle. Engines operating on an absorption cycle use a working fluid and a solvent.

The proposal has already made (French Pat. No. 2 398 101) to operate absorption heat engines by using a working fluid consisting of at least two distinct chemical compounds.

According to another known proposal (U.S. Pat. No. 3,638,452), using a conventional working fluid, the rich solution from the absorber is brought into contact successively with the working fluid, between the generator and the condenser, and then with the working fluid during absorption in the solvent and finally with the weak solvent phase coming from the generator.

The method according to the invention is described as follows:

An absorption method for the generation of cold and/or heat using a working fluid consisting of a mixture of at least two constituents and a solvent, said solvent having a boiling point at atmospheric pressure of at least 100° C. above the bubble point of said working fluid at atmospheric pressure, in which solution (M) of said mixture of at least two constituents is at least partially desorbed and the desorbed mixture of at least two constituents is at least partially condensed at a relatively high pressure, at least part of the resultant condensed mixture is expanded (step c) and vaporized at a relatively low pressure, generating cold, the resultant vaporized mixture is brought into contact with a solvent phase (S) and absorbed in this solvent phase (step d) at a pressure close to that of step (c) supplying heat to an external fluid, solvent phase (S) consisting of the liquid phase resulting from desorption, and heat is exchanged between solvent phase (S), passed from desorption to absorption and solution (M) passed from absorption to desorption, characterized in that the desorped mixture is condensed in at least two successive steps carried out with heat exchange respectively first (step a) with a first fluid and then (step b) with a second fluid, the second fluid being an external fluid, in that the first fluid used in step (a) consists of at least one fraction of solution (M), said first fluid after said heat exchange in step (a) then passing to desorption, and in that said heat exchanges of solution (M) with the solvent phase and with the desorbed mixture (step a) are simultaneous exchanges.

By simultaneous heat exchange, for example between a fluid A on the one hand, and two fluids B and C, on the other hand, it is understood that the heat exchange takes place either between fluid A in the form of a unique stream exchanging heat, in a same heat exchanger, with the fluids B and C, or between fluid A divided into two distinct streams $A_1$ and $A_2$, exchanging heat, one with fluid B and the other with fluid C. Simultaneous exchange excludes sequential exchange, such as that, for example, in U.S. Pat. No. 3,638,452.

The choice of the composition of the working fluid depends on the applications envisaged. For heating water, the working fluid can be a mixture of several halogenated hydrocarbons, which avoids safety problems relating to the utilization of ammonia; for cooling natural gas, the working fluid can be a mixture of several hydrocarbons, chosen from among those present in the gas treated in a manner such that working fluid storage is avoided and to simplify make-up. In addition, the utilization of a working fluid consisting of a mixture of several constituents implies a specific cycle configuration which provides for a more effective and more efficient method than the conventional absorption methods using a pure substance as a working fluid.

The working fluid used in the method according to the invention comprises at least two constituents, each of the constituents having a normal boiling point preferably below 70° C. These constituents can be selected, for example, from among hydrocarbons, whose number of carbon atoms is equal to or less than six, such as for example: methane, ethane, propane, n-butane, isobutane, n-pentane, isopentane, neopentane, ethylene, propylene, 1-butene, 2-butene, n-hexane, isohexane, 2,2-dimethylbutane, 2,3-dimethylbutane, 3-methylpentane. The constituents of the working fluid can also be chosen from among halogenated hydrocarbons such as, for example: tetrafluoromethane, monochlorotrifluoromethane, trifluoromethane, trifluoromonobromomethane, monochloropentalfluoroethane, monochlorodifluoromethane, dichlorodifluoromethane, chlorodifluorobromomethane, trichlorofluoromethane, dichlorofluoromethane, tetrachlorodifluoroethane, trichlorotrifluorethane, dichlorotetrafluoroethane, monochloromonofluoromethane, difluoromethane, monofluoromethane, pentachloromonofluoroethane, hexafluoroethane, dichlorodifluoroethane, chlorotetrafluoroethane, pentafluoroethane, chlorotrifluoroethane, chlorodifluoroethane, trifluoroethane, difluoroethane, octafluoropropane, pentafluoropropane.

The solvent is chosen to be miscible with the mixture forming the working fluid; it is characterized by a normal boiling point of at least 100° C. above the bubble point of the working fluid at atmospheric pressure. This solvent can be a pure substance or a mixture; it can be a hydrocarbon or a mixture of hydrocarbons; in that case, the number of carbon atoms of the solvent molecules shall preferably be at least 6; the hydrocarbons used can be parafinic, aromatic or naphtenic and may be chosen, for example, from among hydrocarbon oils. One or several hydrogen atoms can be substituted by other atoms such as Cl, F, Br and the solvent can also include alcohol, aldehyde, ketone, ester, ether, acid functions having the formulas $CH_3OH$, $R-CH_2OH$, $R-CHOH-R'$, $RR'R''C-OH$, $R-CHO$, $RR'C=O$, $R-COO-R'$, $R-O-R'$, $R-COOH$, in which R, R' and R" represent hydrocarbon radicals which themselves can be partially substituted.

The system therefore includes the utilization of at least three constituents, two of these three constituents forming the working fluid and the third forming the solvent.

In a first version of the method according to the invention, the mixture of constituents forming the working fluid (F) is condensed at a relatively high pressure in at least two successive steps (a) and (b) by heat exchange, first, (step a) with at least part of solution (M) from step (d), then (step b), with an external fluid to which the mixture supplies heat, the resultant mixture is then expanded, vaporized at a relatively low pressure generating cold which is used to cool an external fluid during step (c), and then brought into contact with a liquid solvent phase (S) and absorbed in this solvent phase at a pressure close to that in step (c), supplying heat to an external fluid, during step (d) and solution (M) resulting from step (d) is heated under a pressure close to that in step (a) producing a vapour phase which constitutes the working fluid (F) which is supplied to step (a), and a liquid phase which constitutes the solvent phase (S) which is supplied to step (d), at least part of the heat required for said heating being supplied by heat exchange with fluid (F) in step (a).

Figure 1:
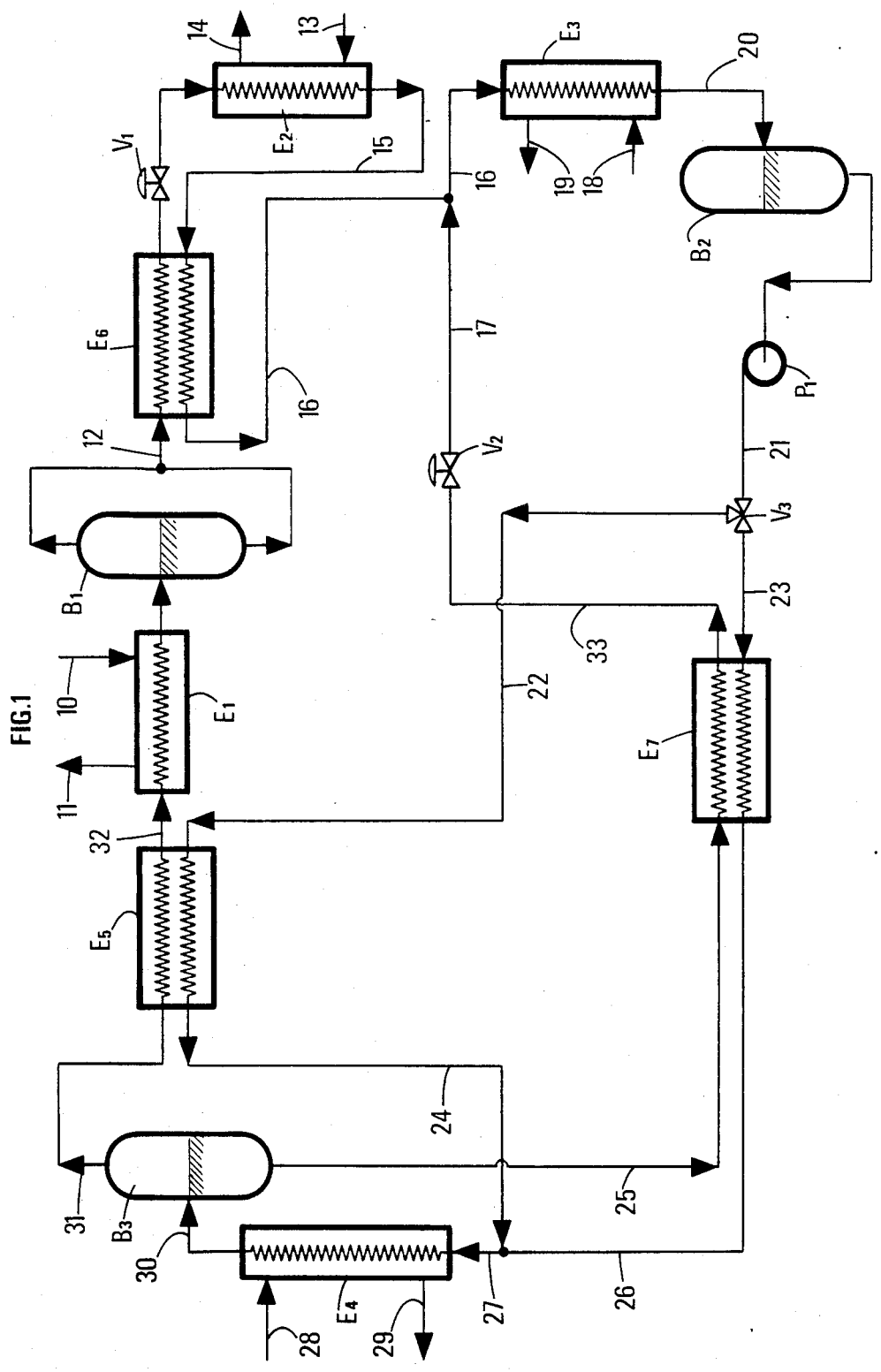
FIG. 1 is an illustration of a first embodiment of the method according to the invention.

An example of embodiment of the first version of the method according to this invention is illustrated by the diagram of FIG. 1. The gaseous working fluid (F) coming from tank B3 and circulating in line 31 is supplied to exchanger E5 in which it condeses partially with cooling by heat exchange, leaves it by line 32, enters exchanger E1 in which it is condensed at least partially cooling by heat exchange with an external fluid which arrives by line 10 and leaves by line 11. The at least partially condensed working fluid (F) is collected in storage tank B1. It leaves it by line 12, enters exchanger E6 in which it is either undercooled if it was completely condensed on leaving E1, or completely condensed and if necessary undercooled if was not completely condensed on leaving E1, and is then expanded through valve V1. It is then vaporized at least partially in exchanger E2, supplying cold to an external fluid which enters E2 by line 13 and leaves it by line 14; the working fluid leaves E2 by line 15, is heated in exchanger E6 by heat exchange with the working fluid at high pressure which arrives by line 12, and leaves it again by line 16. It is then brought into contact with the liquid solvent phase (S) which arrives by line 17; the vapour phase is absorbed in the liquid solvent phase in exchanger E3 yielding heat to an external fluid which arrives by line 18 and leaves by line 19. The solution obtained (M) leaves exchanger E3 by line 20 and is collected in storage tank B2, from which it is recovered by circulation pump P1 and passed into line 21. The liquid output arriving by line 21 in the three-way valve V3 is divided into two fractions. The larger fraction (M1) passes by line 23 into exchanger E7 which it leaves by line 26; the remaining fraction (M2) passes by line 22 into exchanger E5 in which it is heated by heat exchange with the working fluid entering by line 31; it leaves by line 24 and the two fractions (M1) and (M2) are mixed and enter, through line 27 into exchanger E4, in which they are heated by heat exchange with an external hot fluid, which enters by line 28 and leaves by line 29. The solution leaves exchanger E4 through line 30 partially vaporized; the two phases, liquid and vapour, are separated in tank B3. The liquid phase forming the solvent phase (S) leaves B3 by line 25, enters exchanger E7 in which it is cooled by heat exchange with fraction (M1) of solution (M) entering by line 23, leaves E7 by line 33, passes through valve V2 where it undergoes a drop in pressure and arrives by line 17 to be brought into contact with the working fluid (F) circulating in line 16. The gas phase forming the working fluid (F) leaves tank B3 by line 31 and enters exchanger E5 to perform a new cycle.

Figure 2:
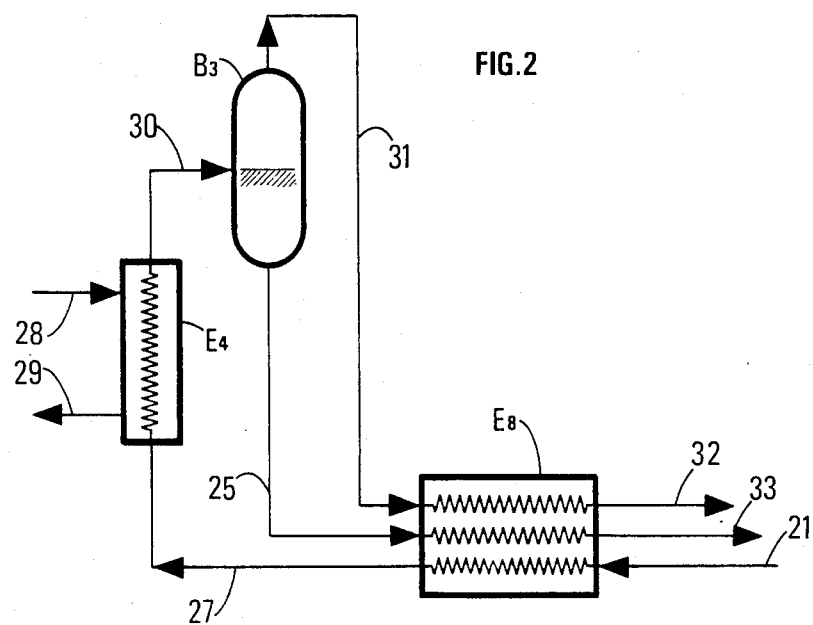
FIG. 2 is another illustration of an embodiment of the method according to the invention.

In another embodiment of the method, exchangers E5 and E7 can be regrouped into a single, three-flow exchanger E8. This embodiment is illustrated in FIG. 2. On leaving pump P1, all the solution (M) circulating in line 21 enters exchanger E8 and leaves it by line 27; the solvent phase (S) leaves tank B3 by line 25, enters E8 and leaves it by line 33; the gaseous working fluid working fluid leaves tank B3 by line 31, enters E8 and leaves it by line 32; heat exchange takes place in E8 between, on the one hand, solution (M) and, on the other hand, solvent phase (S) and working fluid (F). This embodiment simplifies the flow diagram of the method as well as control.

In conventional absorption machines using a pure substance as the working fluid, there is always a heat exchanger E7.

In certain cases (U.S. Pat. No. 3,638,452), an exchanger similar to exchanger E5 of the invention has been provided, but this exchanger is of small interest as the working fluid is condensed at a substantially constant and rather low temperature. Practically no heat is therefore recovered; the author of the U.S. patent is thus obliged to pass solution (M) into an exchanger similar to exchanger E7 of the invention. In the method according to the invention, the working fluid is condensed over a temperature range (for example, a range of 30° to 150° C.), which enables a large quantity of heat to be recovered (at a high thermal level) from the condensation of the working fluid to heat solution (M) and thereby increase the efficiency of the method.

Figure 3:
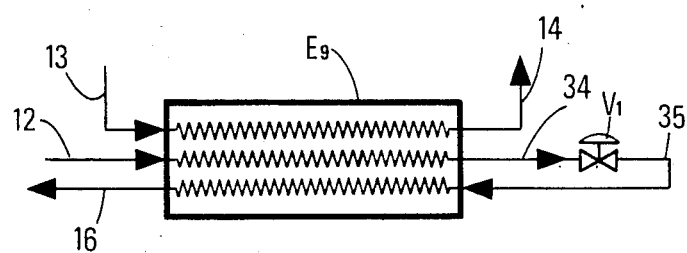
FIG. 3 is an illustration of another embodiment which consists of regrouping heat exchangers.

Another embodiment of the method consists in regrouping exchangers E6 and E2 into a single, three-flow exchanger E9. This embodiment is illustrated in FIG. 3. On leaving exchanger E1, the at least partially condensed working fluid (F) enters exchanger E9 by line 12 and leaves it in a completely liquid and possibly undercooled state by line 34. It is then expanded in valve V1, enters E9 by line 35 and is vaporized at least partially generating cold used on the one hand to cool the working fluid circulating in lines 12 and 34 and, on the other hand, to cool an external fluid which enters E9 by line 13 and leaves it by line 14. This embodiment enables cold to be generated over a wider temperature range than when using the two exchangers E2 and E6 and results in a better integration of the method.

The two embodiments described above can be embodied simultaneously.

An improved embodiment according to the invention enables the temperature difference between the generator and the evaporator to be increased and thereby the field of application of the method to be broadened in particular for generating low temperature cold.

In this improved version of the method according to the invention, the mixture of constituents forming the working fluid (F) is condensed at a relatively high pressure in at least three steps by heat exchange, first, (step a) with at least part of solution (M) resulting from step (g), then, (step b) with an external fluid, one part (F2) of the working fluid (F) formed of at least part of the liquid fraction resulting from step (b) being taken and passed to step (f), the remaining part (F1) of the working fluid being completely condensed and if necessary undercooled during step (e) by heat exhange with the fluid of step (c) during vaporization, fraction (F1) of working fluid (F) then being expanded and vaporized at a relatively low pressure during step (c), delivering cold to an external fluid and to fraction (F1) of the working fluid of step (e), part (F2) of the working fluid being expanded and vaporized at least partially during step (f) at a pressure close to that in step (c) producing the cold required in step (g), the resulting two fractions (F1) and (F2) then being admixed and brought into contact with solvent phase (S) and absorbed partially in this solvent phase at a pressure close to that in step (c) supplying heat to an external fluid during step (d), the gas-liquid mixture resulting from step (d) receiving during step (g) the cold produced in step (f) so as to continue to absorb working fluid (F) in the solvent, solution (M) resulting from step (g) being heated under a pressure close to that in step (a), producing a vapour phase which constitutes the working fluid (F) which is passed to step (a) and a liquid phase which constitutes the solvent phase (S) which is passed to step (d), at least part of the heat required for said heating of solution (M) being supplied by heat exchange with the working fluid (F) in step (a).

Figure 4:
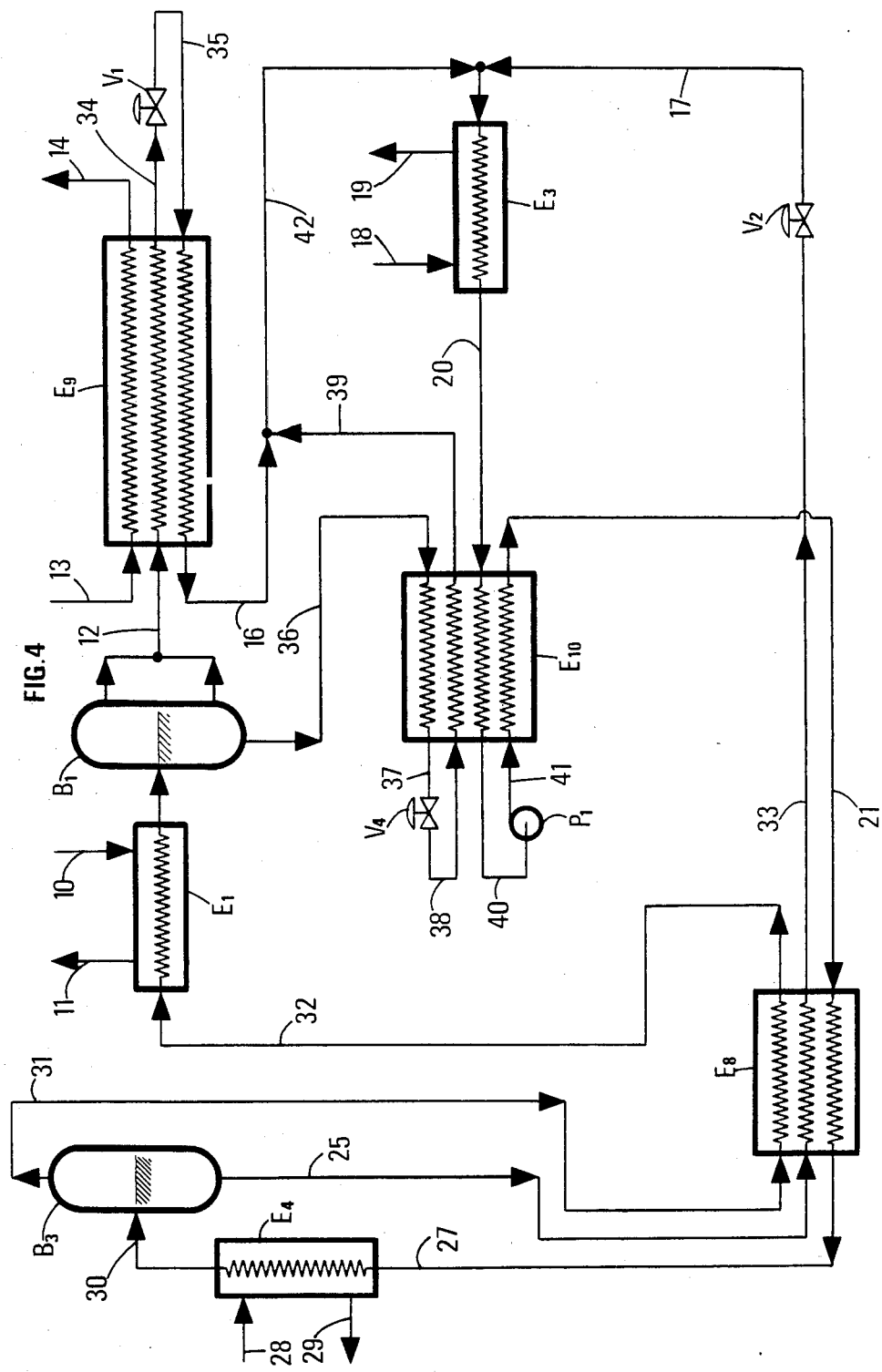
FIG. 4 is an illustration of another embodiment of the method according to the invention.

An example of this improved embodiment of the method according to the invention is illustrated by FIG. 4. The gaseous working fluid (F) from tank B3 circulating in line 31 enters exchanger E8 in which it is cooled by heat exchange, leaves it by line 32, enters exchanger E1 in which it is cooled by heat exchange with an external fluid which arrives by line 10 and leaves by line 11. The partially condensed working fluid (F) is collected in storage tank B1. A fraction (F1) of the working fluid, constituted by the vapour phase and possibly by a part of the liquid phase, leaves tank B1 by line 12, enters exchanger E9, in which it is completely condensed and if necessary undercooled, leaves by line 34, is expanded in valve V1 at a relatively low pressure, enters by line 35 exchanger E9 in which it is at least partially vaporized supplying cold, on the one hand, to fraction (F1) of the working fluid circulating in lines 12 and 34 and, on the other hand, to an external fluid which enters E9 by line 13 and leaves it by line 14, and leaves exchanger E9 by line 16. The remaining fraction (F2) of the working fluid of tank B1, consisting of all or part of the liquid phase, leaves by line 36, enters exchanger E10 in which it is undercooled, leaves by line 37, is expanded in valve V4, enters by line 38 exchanger E10 in which it is at least partially vaporized generating cold, leaves by line 39 and is mixed with fraction (F1) of the working fluid circulating in line 16. The mixture of fractions (F1) and (F2) circulating in line 42 is brought into contact with the liquid solvent phase (S) which arrives by line 17. In exchanger E3, part of the vapour phase is absorbed in the solvent, delivering heat to an external fluid which arrives by line 18 and leaves by line 19. The mixture, partially liquid and vapour, leaves E3 by line 20 and enters exchanger E10, in which all of the vapor phase is absorbed in the solvent by cooling by heat exchange with fraction (F2) of the working fluid which generates cold by vaporizing in the branch of exchanger E10 between lines 38 and 39. The solution (M) obtained leaves E10 by line 40, is recovered by pump P1 which raises its pressure, enters by line 41 exchanger E10, in which it is heated, leaves by line 21, enters exchanger E8 in which it is heated by heat exchange, on the one hand, with part of the working fluid (F) and, on the other hand, with the solvent phase (S) from tank B3, leaves by line 27, enters exchanger E4 in which it is heated by heat exchange with an external fluid which enters by line 28 and leaves by line 29, and leaves E4 by line 30 partially vaporized. The phases, liquid and vapour, are separated in tank B3. The liquid phase, forming the liquid solvent phase (S) leaves tank B3 by line 25, enters exchanger 38 in which it is cooled by heat exchange, leaves by line 33, passes through expansion valve V2 undergoing a drop in pressure, arrives by line 17 and is brought into contact with the working fluid in line 42. The gaseous phase, constituting the working fluid (F), leaves tank B3 by line 31 and enters exchanger E8 to perform another cycle.

In this improved version of the method according to the invention, condensation and absorption of the working fluid terminate at a temperature lower than the ambient temperature, which enables lighter constituents to be used than in the first version of the method according to the invention and therefore the temperature of the evaporator to be reduced for a same generator temperature.

The improved version of the method according to the invention can be the subject of several variants which enable the evaporation temperature to be reduced. In particular, condensation and absorption in the working fluid solvent can be carried out in a greater number of steps and/or at several pressure levels.

Very low evaporator temperatures can also be obtained by providing several absorption cycles in a cascade arrangement (this procedure is commonly used in refrigeration compression cycles). In that case, condensation and absorption in the working fluid solvent of the cycle whose evaporator is at the lowest temperature, designated cycle ($\alpha$), are obtained at least partly by using the cold generated at the evaporator of another absorption cycle, designated cycle ($\beta$), the working fluid of which is condensed and absorbed in a solvent at a temperature greater than or equal to the ambient temperature. In a preferred arrangement of the cascade method, the heat released by cycle ($\beta$) by condensation and absorption in the working fluid solvent can be used at least partially to supply the heat required by exchanger E4 of cycle ($\alpha$). The number of cascade cycles will be all the greater the lower the cooling temperature required.

In the various versions of the method according to the invention, certain exchangers are of the multiple-flow exchanger type: 3 for E8 and E9, 4 for E10. Such exchangers are commonly used in refrigeration and cryogenics, in particular in natural gas liquefaction technologies. They can be with plates (brazed aluminium or stainless steel) or of the coil type. The utilization of brazed aluminium plate exchangers is particularly interesting because of their great compactness and lower cost than coil type exchangers. The other equipment used in the various versions of the method such as pressure tanks, pumps, valves and the other exchangers are of conventional design.

The temperature level resulting from the vaporization of the working fluid depends on the nature of the constituents used and the vaporization pressure. To prevent entry of air which could cause safety problems, this pressure (low pressure of the system) must be greater than atmospheric pressure and preferably between 0.1 and 1 MPa. The value of the high pressure in the process of the invention, that is, the pressure corresponding to the working fluid desorption step in exchanger E4 and its condensation in exchanger E1 is selected in accordance with the end of condensation temperature of the working fluid. It is preferably between 0.5 and 5 MPa.

The level of cold generated by the vaporization of the working fluid in the evaporator depends on the composition of the latter and the cycle arrangement. In addition, the cold is generated over a temperature range, since the working fluid is a mixture of several constituents. With a flow diagram such as that shown in FIG. 1, the level of cold generated at evaporator E2 can be between 30° C. and −30° C. With a flow diagram such as that shown in FIG. 4, the level of cold can be between −30° and −100° C. By using multistage or cascade arrangements, the level of cold can be of the order of −160° C., that is, the natural gas liquefaction temperature.

High level heat is provided by exchanger E4 to desorb the working fluid from the solution is at a preferred temperature level of between 100° and 300° C.

When several cycles are arranged in cascade, the heat supplied to the cycles whose exchangers E1 and E3 are cooled to a temperature below ambient temperature can be at a temperature below 100° C., in particular, if this heat is suplied by condensation of the working fluid of another cycle, or by its absorption in the solvent. In that case, the temperature of the heat supplied can be at about ambient temperature.

The heat supplied to external fluids during part of the condensation of the working fluid in exchanger E1 and during absorption of the working fluid in solvent in exchanger E3 is at a temperature intermediate between that of the generator and that of the evaporator. In the case of a unique cycle, not included in the cascade, the condenser and evaporator temperature is preferentially between 0° C. and 200° C.

The method according to the invention is illustrated by the two following examples :

EXAMPLE 1

In this example, the procedure followed is that represented in the flow diagram in FIG. 1, in which the modification shown diagramatically in FIG. 3 has been included, that is, exchangers E6 and E2 of FIG. 1 have been replaced by a single, three-flow exchanger E9. The fluid used are kerosene as the solvent, and a mixture of ethane-propane-butane as the working fluid.

The solvent-working fluid mixture leaves exchanger E3 by line 20 completely liquid at a temperature of 35° C. and a pressure of 0.46 MPa. This solution is recovered by pump P1 which raises the pressure to 1.55 MPa. The flow of solution is divided into two parts: the largest part, that is, 92.5% passes into line 23, is heated in exchanger E7 by heat exchange with the solvent phase. The remaining part passes into line 22, enters exchanger E5 in which it is heated by heat exchange with the working fluid. The two parts are remixed and the entire solution then enters exchanger E4 in which it is heated by heat exchange with a hot external liquid to a temperature of 200° C. The solution leaves exchanger E4 by line 30, partially vaporized, the two phases, liquid and vapour, being separated in tank B3. The vapour phase constituting the working fluid passes by line 31 and enters exchanger E5 in which it is cooled, condensing partially, passes into condenser E1 in which it is cooled by heat exchange with an external fluid, leaves E1 completely condensed at a temperature of 35° C., enters exchanger E9 in which it is undercooled to a temperature of −8.5° C., is expanded in valve V1, enters at a temperature of −13.5 by line 35 exchanger E9, in which it is vaporized generating cold which is used to cool the external fluid and undercool the working fluid, and leaves exchanger E9 at 30° C. by line 16. The solvent-rich liquid phase of tank B3 passes into line 25, is cooled in exchanger E7, expanded in valve V2 and mixed with the working fluid arriving by line 16. The mixture enters exchanger E3, the working fluid is absorbed in the solvent releasing heat which is evacuated by an external fluid.

In this example, the ratio cold generated at evaporator E9 to heat supplied in exchanger E4 is 0.81. The ratio is 0.61, using in the same cycle and at the same temperature, a couple kerosene-propane.

EXAMPLE 2

In this example, the procedure followed is that represented in FIG. 4. The solvent is a hydrocarbon oil and the working fluid a mixture of ethane, propane, butane and pentane.

The working fluid is partially condensed in exchanger E1, delivering heat to cooling water external to the cycle, entering by line 10 and leaving by line 11. On leaving E1, the working fluid is collected in tank B1. It is at a temperature of 35° C. and a pressure of 0.64 MPa and partially condensed. Part of the liquid phase of the working fluid, representing 57% by weight of the working fluid, leaves tank B1 by line 36, enters exchanger E10 in which it is undercooled, expanded in valve V4 to a pressure of 0.15 MPa, and then enters by line 38 at a temperature of −18.5° C. exchanger E10 in which it is vaporized generating cold, leaves by line 39 at a temperature of 30° C. The other part of the working fluid constituted by the vapour phase and the rest of the liquid phase leaves tank B1 by line 12, enters exchanger E9, in which it is cooled by heat exchange, which results in the condensation of the vapour phase and then to undercooling, leaves by line 34, is expanded in valve V1 to a pressure of 0.15 MPa, enters by line 35 at a temperature of −50° C. exchanger E9, in which it is vaporized generating cold which is supplied, on the one hand, to the working fluid circulating in lines 12 and 34 and, on the other hand, to an external fluid, leaves by line 16 at a temperature of 30° C., is mixed with the fraction of the working fluid circulating in line 39, the whole of the working fluid circulating in line 42 being brought into contact with the liquid phase from line 17. Part of the vapour phase is absorbed in the liquid solvent phase in exchanger E3, delivering heat to external cooling water entering by line 18 and leaving it by line 19. The mixture, partially liquid and vapour, leaves exchanger E3 by line 20 at a temperature of 35° C. and enters exchanger E10 in which it is cooled by heat exchange, which results in the absorption of the whole of the vapor phase in the solvent phase. The solution leaves exchanger E10 by line 40 at its bubble point, is recovered by pump P1, which raises its pressure to 0.65 MPa, enters by line 41 exchanger E10 in which it is heated, leaves it by line 21, enters exchanger E8, in which it is heated by heat exchange, on the one hand, with the solvent phase and, on the other hand, with the working fluid, leaves by line 27, enters exchanger E4 in which it is heated by heat exchange with a hot external fluid which enters E4 by line 28 and leaves by line 29. The solution leaves exchanger E4 by line 30 partially vaporized at a temperature of 210° C. The two phases, liquid and vapour, are separated in tank B3. The liquid phase, containing 96.3% by weight of oil, leaves tank B3 by line 25, enters exchanger E8 in which it is cooled by heat exchange with the solution, leaves by line 33, is expanded in valve V2 to a pressure of 0.142 MPa, leaves by line 17 and is again brought into contact with the working fluid arriving by line 42. The gaseous phase leaves tank B3 by line 31, enters exchanger E8 in which it is cooled and partially condensed by heat exchange with the solution, leaves by line 32 and enters exchanger E1 to perform another cycle.

What is claimed is:

1. In an absorption method for the generation of cold and/or heat comprising using (i) a working fluid (F) consisting essentially of at least two constituents and (ii) a solvent (S), said solvent having a boiling point at atmospheric pressure of at least 100° C. above the bubble point of said working fluid at atmospheric pressure partially desorbing a solution (M) and at least partially condensing resulting desorbent gases at a relatively high pressure, expanding and vaporizing at least a part of the resultant condensed desorbent gases in a step (c) at a reltively low pressure, thereby generating cold and forming a vaporized mixture; and passing the resultant vaporized mixture to a step (d) into contact with said solvent (S) consisting essentially of the liquid phase resulting from the desorbing step, and absorbing the vaporized mixture in said solvent phase (S) at a pressure proximate to that of step (c), supplying absorption heat to an external fluid, and exchanging heat between solvent phase (S), passed from desorption to absorption and solution (M) passed from absorption to desorption, the improvement wherein at least two constituents of said working fluid are miscible in said solvent and said solution (M) is a solution of said at least two constituents in said solvent (S), and wherein said condensing of resulting desorbent gases is effected in at least two successive steps the first of which comprises exchanging heat with at least a portion of said solution M passed from absorption to desorption and the second of which comprises exchanging heat with an external heat-receiving medium, whereby heat is delivered to said solution M in greater amount as when using a single constituent working fluid.

2. A method according to claim 1 in which working fluid (F) consists of at least two constituents selected from the group consisting of methane, ethane, propane, n-butane, isobutane, n-pentane, isopentane, neopentane, ethylene, propylene, 1-butene, 2-butene, n-hexane, isohexane, 2,2-dimethylbutane, 2,3-dimethylbutane, 3-methylpentane, tetrafluoromethane, monochlorotrifluoromethane, trifluoromethane, trifluoromonobromomethane, monochloropentafluoroethane, monochlorodifluoromethane, dichlorodifluoromethane, chlorodifluorobromomethane, trichlorofluoromethane, dichlorofluoromethane, tetrachlorodifluoroethane, trichlorotrifluorethane, dichlorotetrafluoroethane, monochloromonofluoromethane, difluoromethane, monofluoromethane, pentachloromonofluoroethane, hexafluoroethane, dichlorodifluoroethane, chlorotetrafluoroethane, pentafluoroethane, chlorotrifluoroethane, chlorodifluoroethane, trifluoroethane, difluoroethane, octafluoropropane, pentafluoropropane.

3. A method according to claim 1 in which solvent (S) is a paraffinic, aromatic or naphthenic hydrocarbon whose number of carbon atoms is at least 6, a hydrocarbon oil, a halogenated hydrocarbon, an alcohol of formula $CH_3OH$, $R-CH_2OH$, $R-CHOH-R'$ or $RR'R''C-OH$, an aldehyde of formula $R-CHO$, a ketone of formula $RR'C=O$, an ester of formula $R-COO-R'$, an ether of formula $R-O-R'$, an organic acid of formula $R-COOH$, or a mixture thereof, R, R', R" representing hydrocarbon radicals which themselves can be partly substituted.

4. A method according to claim 1 characterized in that the condensation pressure of working fluid (F) is between 0.5 and 5 MPa, the vaporization pressure of working fluid (F) is between 0.1 and 1 MPa, the absorption pressure of the working fluid (F) in the liquid solvent phase (S) is between 0.1 and 1 Mpa and the heating pressure of solution (M) is between 0.5 and 5 MPa.

5. A method according to claim 1 characterized in that the maximum heating temperature of solution (M) is between 100° and 300° C.

6. A method according to claim 1 characterized in that the lowest cold generation temperature is between −10° and −160° C.

7. A method according to claim 1 characterized in that, on completion of step (b), the working fluid is condensed and/or undercooled, and vaporized at least partially supplying cold to an external fluid in a single three-way exchanger.

8. A method according to claim 1 in which the heat supplied to an external fluid during steps (b) and (d) is at a temperature of between 0° C. and 200° C.

9. A method according to claim 1, said improvement further comprising expanding and vaporizing at relatively low pressure a part (F2) of the condensed mixture resulting from step (b), thereby producing a vapor phase (F2) and cold, admixing the resultant vapor phase (F2) with a vapor phase (F1) resulting from step (c), and contacting the resultant mixture (F1+F2) with the solvent (S) in a step (d), and cooling the resultant fluid in a manner such as to obtain said solution (M).

10. A method according to claim 1, said improvement further comprising the steps of condensing the working fluid in a step (e), said step comprising dividing the working fluid (F) resulting from step (b) into two parts, and condensing a first part (F1) consisting essentially of at least a vapor phase of the working fluid (F) using at least part of the cold generated in a step (c), and then expanding and vaporizing said condensed first part (F1) at a relatively low pressure during said step (c), thereby generating said cold, and transferring said cold to the working fluid in step (e), and in a step (f) at least partially expanding and vaporizing at a pressure close to that in step (c) a second part (F2) consisting essentially of at least part of the liquid phase of working fluid (F) resulting from step (b), thereby generating cold, in a step (d) joining together part (F1) from step (c) and part (F2) from step (f) and contacting them with sovlent phase (S) and at least partially absorbing them in this solvent phase at a pressure close to that in step (c), thereby supplying heat to an external fluid, the liquid-vapor mixture resulting from step (d) receiving during a step (g) the cold generated in step (f) so as to continue absorption in solvent phase (S), resulting in a solution (M), heating said solution (M) at a pressure close to that in step (a), wherein part of the heat required for said heating of solution (M) is supplied by heat exchange with the working fluid (F) in step (a), thereby producing a vapor phase which comprises the working fluid (F) which is sent to step (a) and a liquid phase which comprises the solvent phase (S) which is sent to step (d).

11. A method according to claim 9, wherein a first part of the liquid phase (F2) is expanded and vaporized in a step (f) at a pressure close to that of step (c), thereby generating cold, and a second part of the liquid phase (F2) is expanded and vaporized at relatively low pressure producing a vapor phase (F2), which vapor phase (F2) is then admixed with a vapor phase (F1) resulting from step (c) and the resultant mixture is contacted with the solvent (S) in a step (d) and is subsequently cooled by the cold produced in step (f).

12. A method according to claim 1, wherein the vapor phase of said working fluid is totally absorbed in said solvent, forming an intimate mixture therwith.

* * * * *